United States Patent
Schneider

(10) Patent No.: US 8,634,549 B2
(45) Date of Patent: Jan. 21, 2014

(54) CIPHERTEXT KEY CHAINING

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1236 days.

(21) Appl. No.: 12/116,485

(22) Filed: May 7, 2008

(65) Prior Publication Data

US 2009/0279697 A1   Nov. 12, 2009

(51) Int. Cl.
*G06F 21/00* (2006.01)

(52) U.S. Cl.
USPC ......... 380/28; 726/1; 726/26; 713/168; 713/189; 380/29; 380/44; 380/286; 709/229

(58) Field of Classification Search
USPC ............................. 380/37, 42, 28
See application file for complete search history.

(56) References Cited

U.S. PATENT DOCUMENTS

| | | | |
|---|---|---|---|
| 4,107,458 A | | 8/1978 | Constant |
| 4,417,338 A | * | 11/1983 | Davida .......................... 380/286 |
| 5,195,136 A | * | 3/1993 | Hardy et al. ................... 380/43 |
| 5,586,186 A | | 12/1996 | Yuval et al. |
| 5,673,319 A | * | 9/1997 | Bellare et al. ................. 713/181 |
| 6,236,729 B1 | | 5/2001 | Takaragi et al. ............. 380/286 |
| 6,459,792 B2 | | 10/2002 | Ohmori et al. ................. 380/37 |
| 6,742,122 B1 | * | 5/2004 | Morishita ....................... 713/189 |
| 7,010,689 B1 | * | 3/2006 | Matyas et al. ................. 713/168 |
| 2002/0025037 A1 | * | 2/2002 | Sano ................................. 380/44 |
| 2003/0059040 A1 | * | 3/2003 | Rose et al. ......................... 380/1 |
| 2004/0161105 A1 | * | 8/2004 | Park et al. ......................... 380/28 |
| 2006/0088156 A1 | * | 4/2006 | Belenky et al. ................. 380/28 |
| 2006/0126827 A1 | * | 6/2006 | Milleville ........................ 380/28 |
| 2007/0050696 A1 | | 3/2007 | Piersol et al. |
| 2007/0053516 A1 | * | 3/2007 | Katoozi et al. ............... 380/259 |
| 2007/0101130 A1 | * | 5/2007 | Tardo ............................ 713/161 |
| 2007/0189524 A1 | * | 8/2007 | Rogaway ........................ 380/37 |
| 2007/0230691 A1 | * | 10/2007 | Elhamias et al. ............... 380/37 |
| 2007/0253549 A1 | * | 11/2007 | Celikkan et al. ................ 380/42 |
| 2008/0010449 A1 | * | 1/2008 | Holtzman et al. ............. 713/157 |
| 2008/0123860 A1 | * | 5/2008 | Choi ............................. 380/278 |
| 2009/0034715 A1 | * | 2/2009 | Ramasamy et al. ............ 380/28 |
| 2009/0214026 A1 | * | 8/2009 | Gueron et al. .................. 380/29 |

OTHER PUBLICATIONS

USPTO, Office Action for U.S. Appl. No. 12/154,612 mailed on Sep. 2, 2010.
USPTO, Final Office Action for U.S. Appl. No. 12/154,612 mailed on Dec. 27, 2010.
USPTO, Office Action for U.S. Appl. No. 12/154,612 mailed on Apr. 29, 2011.
USPTO, Final Office Action for U.S. Appl. No. 12/154,612 mailed on Sep. 20, 2011.
USPTO, Office Action for U.S. Appl. No. 12/154,612 mailed on Jun. 1, 2012.
USPTO, Advisory Action for U.S. Appl. No. 12/154,612 mailed on Feb. 28, 2011.

(Continued)

*Primary Examiner* — Morshed Mehedi
(74) *Attorney, Agent, or Firm* — Lowenstein Sandler LLP

(57) ABSTRACT

Some embodiments of a method and apparatus for encrypting and decrypting data have been presented. In one embodiment, a current key is generated from a prior ciphertext block and another key, which may include a prior key used to encipher the prior ciphertext block or an initialization vector. Then a current plaintext block is enciphered using the current key to generate a current ciphertext block.

33 Claims, 5 Drawing Sheets

(56) References Cited

OTHER PUBLICATIONS

USPTO, Advisory Action for U.S. Appl. No. 12/154,612 mailed on Dec. 1, 2011.
USPTO, Notice of Allowance for U.S. Appl. No. 12/154,612 mailed Nov. 8, 2012.
Eng, Asgaut, "Cipher Block Chaining", 1 page, 1996. http://www.pvv.ntnu.no/~asgaut/crypto/thesis/node15.html.
Barker et al. Recommendation for Key Management—Part I: General. NIST Special Publication 800-57 Mar. 2007. pp. 1-142.
Dworkin. "Recommendation for Block Cipher Mode of Operation" NIST 2001. pp. 1-66.
RSA Laboratories. "What is Output Feedback Mode". Http://rsa.com/rsalabs/node.asp?id=2173. Oct. 20, 2007 Internet Archive Wayback Machine. pp. 1-2.
Tan, "The PLFG parallel pseudorandom number generator" Feb 2002 pp. 693-698. Future generation computer systems vol. 18 issue 5.

* cited by examiner

CIPHERTEXT KEY CHAINING

TECHNICAL FIELD

Embodiments of the present invention relate to data encryption, and more specifically to ciphertext key chaining.

BACKGROUND

Encryption is a process of transforming information (referred to as plaintext) into an unreadable form (referred to as ciphertext). Decryption is a transformation that recovers the plaintext from the ciphertext. A cipher performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher. As such, the term "encipher" and "encrypt" may be used interchangeably in the following discussion. Likewise, the term "decipher" and "decrypt" may also be used interchangeably in the following discussion.

Encryption is used to protect military and civilian systems, examples of which include Internet e-commerce, mobile telephone networks, bank automatic teller machines, etc. As technology and computing power advance, new vulnerabilities are commonly discovered for encryption mechanisms that were previously considered secure. When such weaknesses are discovered, new encryption mechanisms and techniques are required to maintain security of sensitive information.

Conventionally, cyphertext block chaining provides an encryption mode to prevent an attacker from being able to create a code table from commonly repeated blocks. For instance, a block of all space characters always results in the same ciphertext block. Specifically, an output stream is prepended with a random block, which is referred to as an initialization vector (IV). For each block to be enciphered, the IV is combined with the current block of plaintext using a binary exclusive or (XOR) operation. Then the resulting block is enciphered with a key. The current IV is replaced with the resulting enciphered block, which is appended to the output stream.

One problem with the above conventional approach is that no additional security is provided against known plaintext attacks. This is because while one of the inputs to the encryption algorithm (the plaintext block) is changed in these modes, the other input, the key, remains static.

BRIEF DESCRIPTION OF THE DRAWINGS

The present invention is illustrated by way of example, and not by way of limitation, in the figures of the accompanying drawings and in which.

DETAILED DESCRIPTION

Figure 1:
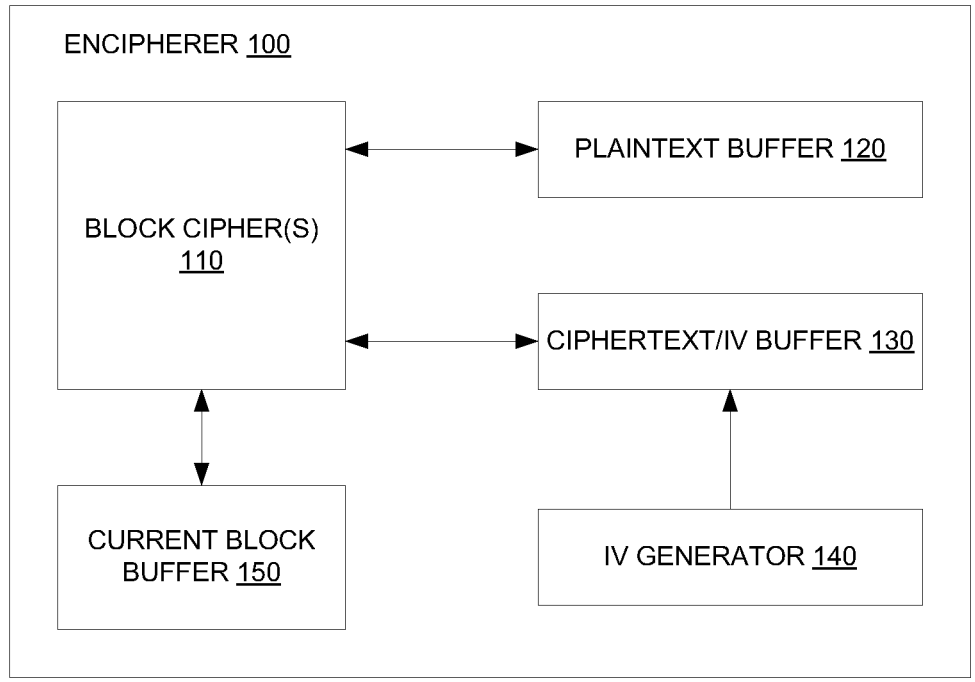
FIG. 1 illustrates an encipherer, in accordance with one embodiment of the present invention.

Described herein are embodiments of a method and apparatus for encrypting and decrypting data with ciphertext key chaining. In one embodiment, a current key is generated from a prior ciphertext block and another key, which may include a prior key used to encipher the prior ciphertext block or an initialization vector. Then a current plaintext block is enciphered using the current key to generate a current ciphertext block. Likewise, an encipherer deciphering a stream of ciphertext blocks may generate a current key from a prior ciphertext block in the stream and the other key. A current ciphertext block may then be deciphered using the current key to generate a plaintext block. More details of some embodiments of ciphertext key chaining are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an encipherer 100, in accordance with one embodiment of the present invention. The encipherer 100 enciphers (or encrypts) and deciphers (or decrypts) data. In one embodiment, the encipherer 100 includes one or more block ciphers 110, which are coupled to one or more input buffers and one or more output buffers. When encrypting, the input buffer is identified with plaintext buffer 120, and the output buffer is identified with ciphertext/IV buffer 130. The ciphertext/IV buffer may be coupled with an IV (initialization vector) generator 140. When decrypting, the input buffer is identified with ciphertext/IV buffer 130, and the output buffer is identified with plaintext buffer 120. The encipherer 100 may also include a current block buffer 150 coupled to the block ciphers 110.

Block ciphers 110 are substitution ciphers that operate on fixed-length groups of bits known as blocks. For example, a block may have 64 bits of data, 128 bits of data, 256 bits of data, etc. Where data to be encrypted is longer than a block, the data may be divided into multiple blocks, and each block is separately encrypted. In one embodiment, block ciphers may execute an encryption and a decryption algorithm, each of which accepts an input block of size n bits as a first input and a key of size k bits as a second input, and produce an n-bit output block. For example, a block cipher might take as an input a 128-bit block of plaintext (which is unciphered data) and an 80 bit key, and output a corresponding 128-bit block of ciphertext (which is ciphered data). Likewise, the block cipher may take as an input a 128-bit block of ciphertext and the 80-bit key, and output a 128-bit block of plaintext. In another embodiment, the encryption algorithm may accept an input block of size m bits, and output a block of size n bits, and the decryption algorithm may accept an input block of size n bits, and output a block of size m bits. Some exemplary block sizes for a block cipher to operate on include 64 bit (i.e., 8 byte) and 128 bit (i.e., 16 byte), and some exemplary common key sizes include 40 bits, 56 bits, 64 bits, 80 bits, 128 bits, 160 bits, 168 bits, 192 bits, and 256 bits. Other sized blocks and keys may also be used. Some examples of block ciphers include twofish, blowfish, serpent, data encryption standard (DES), advanced encryption standard (AES), CAST5, international data encryption algorithm (IDEA), etc.

As previously discussed, the keys used by some conventional encipherers are static. In other words, the keys remain unchanged throughout the encryption process. Such static keys provide no additional security against known plaintext attacks. To improve security, the key is changed for each block in some embodiments. Specifically, a prior block of ciphertext may be used to modify a predetermined key in order to generate another key to encipher a current block of plaintext. For instance, the prior block of ciphertext may be exclusive-OR'ed (XOR'ed) with the predetermined key to generate another key. As such, the key used in enciphering changes for each block of plaintext based on a prior block of ciphertext, instead of remaining static. Thus, this approach may also be referred to as ciphertext key chaining.

Plaintext buffer 120 may be a storage device or part of a storage device that contains unencrypted data. The data may be either awaiting encryption, or the result of decryption.

Likewise, ciphertext/IV buffer 130 may be a storage device or part of a storage device that contains encrypted data. The data may be either awaiting decryption, or the result of encryption.

Current block buffer 150 may be a storage device or part of a storage device large enough to contain a bit sequence that is the same size as the input block size or the output block size of the block ciphers 110. Block ciphers 110 may retrieve data to be enciphered from current block buffer 150 when encrypting. Alternatively, block ciphers 110 may store the deciphered data into current block buffer 150 when decrypting.

In some embodiments, IV generator 140 generates random or unpredictable sequences of bits that are of the same size as the input block size of the block ciphers 110. These sequences of bits may be referred to as initialization vectors (IVs). The encipherer 100 may direct IV generator 140 to generate one or several of these bit sequences at a time, and store the resulting sequences in ciphertext/IV buffer 130.

In some embodiments, IV generator 140 creates an initial IV by generating a block of random data. The initial IV may then be stored in the ciphertext/IV buffer 130. The initial IV is also prepended to an output ciphertext stream. The encipherer 100 then combines the initial IV with a predetermined key, which may also be referred to as the original key. For example, the encipherer 100 may perform an XOR function on the initial IV and the predetermined key. The result, which is referred to as a generated key or a current key, is used to encipher a first plaintext block in plaintext buffer 120. One or more of the block ciphers 110 may encipher the first plaintext block to generate a first ciphertext block, which is stored in the ciphertext/IV buffer 130. As such, the encipherer 100 replaces the initial IV with the first ciphertext block. In other words, the first ciphertext block is made the current IV. Furthermore, the first ciphertext block is appended to the output ciphertext stream. Then the encipherer 100 replaces the generated key with the original key. The encipherer 100 combines the current IV with the original key to generate another current key for enciphering the next plaintext block. The encipherer 100 loads the next plaintext block into plaintext buffer 120 and repeats the above operations to encipher the next plaintext block. The encipherer 100 repeats the above operations until all plaintext blocks have been enciphered.

In some embodiments, encipherer 100 decrypts data that has been encrypted using the above approach. Specifically, encipherer 100 may load a first block at the beginning of an incoming ciphertext stream into ciphertext/IV buffer 130 as an initial IV. The encipherer 100 then combines the initial IV with the predetermined key (which is the same key used by the encipherer that has encrypted the incoming ciphertext stream) to generate a current key. Encipherer 100 loads the second block (subsequent to the first block) into ciphertext/IV buffer 130 as the current ciphertext block. Using the current key, encipherer 100 decrypts the current ciphertext block and loads the resultant plaintext block into plaintext buffer 120. The current ciphertext block is then used as the current IV, which is combined with the original key to generate another current key. The next ciphertext block in the incoming ciphertext stream is then loaded into ciphertext/IV buffer 130 as the current ciphertext block. Encipherer 100 deciphers the next ciphertext block using the current key. Encipherer 100 repeats the above process to decipher the ciphertext blocks sequentially until all ciphertext blocks in the incoming ciphertext stream have been decrypted.

By combining a prior ciphertext block with the original key, extra security against known plaintext attacks may be provided. This is because the current key used to encipher each plaintext block changes with the data, instead of remaining static. For ciphers that have a larger key than block size (such as IDEA, which uses a 128-bit key with a 64-bit block size), the most recent several blocks may be used as the current IV for combining with the larger key. On the other hand, for ciphers that have a shorter key than block size (such as the original DES), the ciphers may take the key bits from wherever it happens to be convenient. In some embodiments, the above ciphertext key chaining mechanism is combined with other ciphertext block chaining mechanisms (e.g., variable block chaining) to provide a hybrid chaining encryption scheme.

Figure 2:
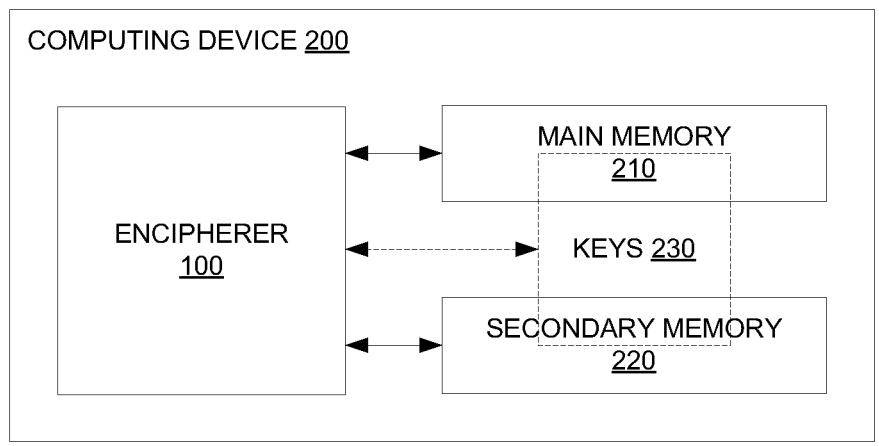
FIG. 2 illustrates an exemplary computing device, in accordance with one embodiment of the present invention.

FIG. 2 illustrates an exemplary computing device 200, in accordance with one embodiment of the present invention. The computing device 200 includes encipherer 100 connected with a main memory 210 and a secondary memory 220. Details of some embodiments of encipherer 100 have been described above. The main memory 210 may include volatile memory (e.g., read-only memory (ROM), flash memory, dynamic random access memory (DRAM) such as synchronous DRAM (SDRAM) or Rambus DRAM (RDRAM), etc.) or static memory (e.g., flash memory, static random access memory (SRAM), etc.). The secondary memory 220 may include one or more persistent data storage devices that may include, for example static memory, hard drives, optical drives, tape backup systems, etc. The secondary memory 220 may be local to the computing device 200 (as illustrated), or external to the computing device 200.

In one embodiment, keys 230 are stored in secondary memory 220. In another embodiment, keys 230 are stored in main memory 210. Keys 230 may be stored, for example, in a protected region of main memory 210 or secondary memory 220 (memory accessible only to certain processes). In yet another embodiment, keys 230 are stored externally to computing device 200. Such externally stored keys 230 may be stored, for example, in a universal serial bus (USB) dongle, firewire dongle, or other external storage device. In embodiments that implement external keys, encrypted regions of the main memory 210 and secondary memory 220 may not be decrypted unless the external storage device having keys 230 is communicatively coupled to computing device 200.

Keys 230 may include one or more block cipher keys for use with block cipher(s) 110 of encipherer 100. In one embodiment, keys 230 also include the initialization value to use in current block buffer 150 of encipherer 100 when encryption or decryption is started. In an alternative embodiment, the initialization value used is fixed. In one embodiment, keys 230 determine which one or more of the block cipher(s) 110 are used by encipherer 100. In an alternative embodiment, this selection is fixed. In one embodiment, keys 230 are encrypted such that a password must be provided to enable access to them. Alternatively, keys 230 may not be encrypted.

In one embodiment, encipherer 100 is a hardware component of computing device 200. Alternatively, encipherer 100 may include software that is part of an operating system, an application, or a combination thereof. Encipherer 100 may also be a combination of two or more of software, firmware, and hardware.

In some embodiments, encipherer 100 can encipher data in the main memory 210 and the secondary memory 220 to secure such data. When enciphering data, new keys are generated using previously enciphered blocks (also referred to as prior ciphertext blocks), and the generated keys may or may not be stored. In one embodiment, the encipherer 100 is configured to encrypt data in all of secondary memory 210 and main memory 220. In another embodiment, only some of the data in main memory 210 and/or secondary memory 220 is encrypted (e.g., using filesystem-level encryption). In both instances, encrypted data may not be read or used until encipherer 100 deciphers the enciphered data using the same keys 230 used to encrypt the data.

Figure 3:
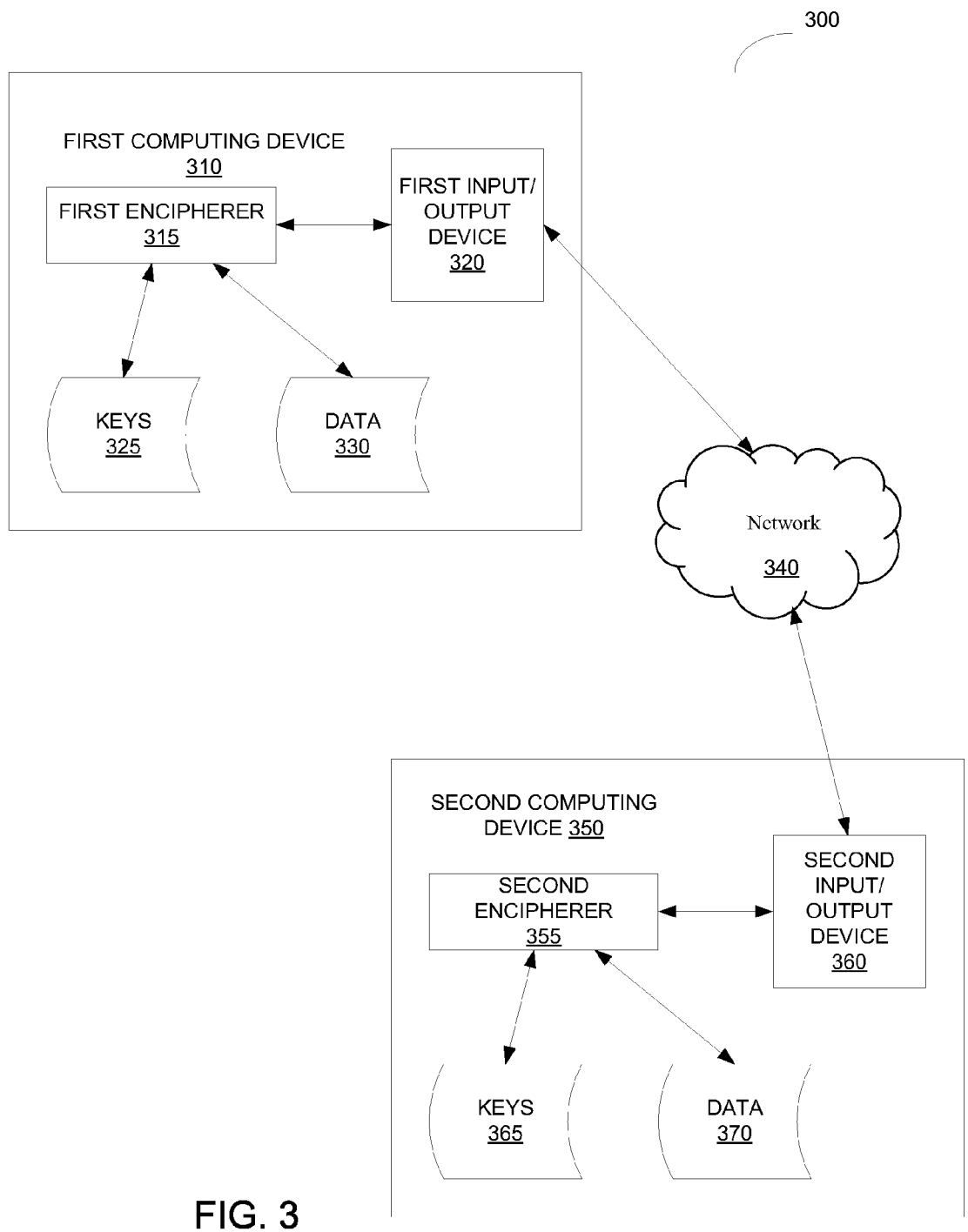
FIG. 3 illustrates an exemplary network architecture, in which embodiments of the present invention may operate.

FIG. 3 illustrates an exemplary network architecture 300, in which embodiments of the present invention may operate. The network architecture 300 may include a first computing device 310 connected to a second computing device 350 via a network 340, which may include a public network (e.g., Internet) and/or a private network (e.g., Ethernet or a local area Network (LAN)).

First computing device 310 and second computing device 350 may be personal computers (PCs), servers, personal data assistants (PDAs), cellular phones, etc. First computing device 310 and/or second computing device 350 may be connected with one or more additional computing devices (not shown), and may provide data encryption services to the additional computing devices. Thereby, it may not be necessary for the additional computing devices to include an encipherer.

Each of the first computing device 310 and the second computing device 350 includes an input/output 320 and 360, an encipherer 315 and 355, data 330 and 370, and keys 325 and 365, respectively. In one embodiment, the first encipherer 315 and second encipherer 355 are each examples of encipherer 100 of FIG. 1. First encipherer 315 enciphers data 330 using a current IV combined with keys 325, which may be internal or external to first computing device 310. For instance, first encipherer 315 may use a prior ciphertext block as a current IV and XOR the current IV with one of the keys 325 to generate a current key to encipher a current plaintext block. First encipherer 315 forwards the encrypted data 330 to the first input/output 320, which sends the encrypted data over the network 340 to the second input/output 360 of the second computing device 350. Data may be sent between first input/output 320 and second input/output 360 using a network application. Examples of network applications include those that communicate using file transfer protocol (FTP), telnet, email, instant messaging, hyper text transfer protocol (HTTP), etc. The second input/output device 360 passes on the data to the second encipherer 355, which decrypts the data 370 using keys 365. To successfully decrypt data 370, second encipherer 355 must have access to the same keys 325 that have been used to encrypt data 330.

Figure 4:
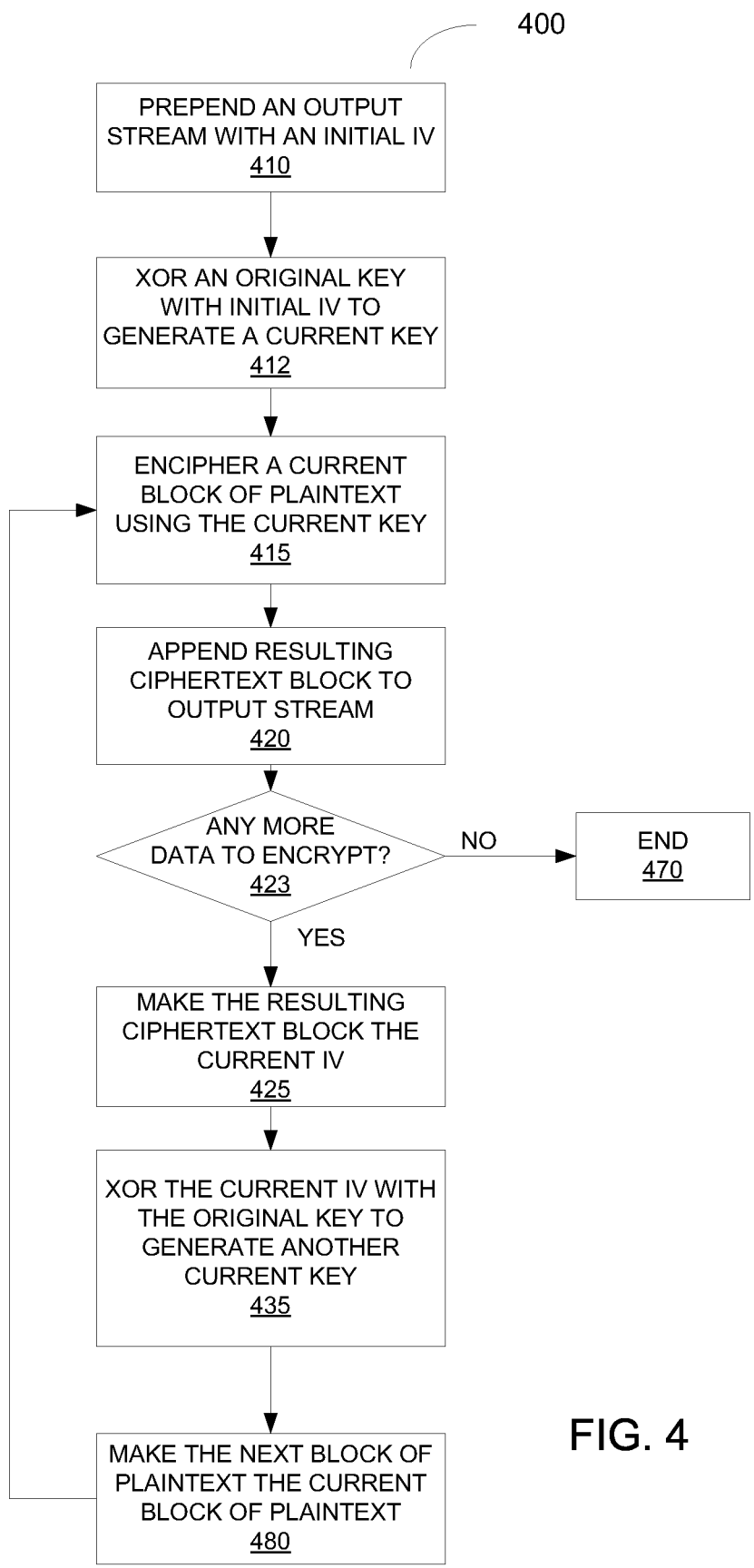
FIG. 4 illustrates a flow diagram of one embodiment for a method of encrypting data.

FIG. 4 illustrates a flow diagram of one embodiment for a method 400 of encrypting data. The method may be performed by processing logic that may comprise hardware (e.g., circuitry, dedicated logic, programmable logic, microcode, etc.), software (such as instructions run on a processing device), or a combination thereof. In one embodiment, method 400 is performed by encipherer 100 of FIG. 1

Referring to FIG. 4, method 400 begins by prepending an output stream with an initial IV at block 410. The initial IV may include a block of random data. Then an original key is combined with the initial IV to generate a current key at block 412. For instance, the original key may be XOR'ed with the initial IV to generate the current key. At block 415, a current plaintext block is enciphered using the current key to generate a current ciphertext block, which is appended to the output stream at block 420. Then it is checked if there is more data to encrypt at block 423. If there is no more data to encrypt, the process ends at block 470. Otherwise, the process continues at block 425.

At block 425, the resultant ciphertext block is made a current IV, which is XOR'ed with the original key to generate another key at block 435. This newly generated key replaces the current key to become the current key for enciphering the next plaintext block. The next plaintext block is then made the current plaintext block at block 480. The process transitions back to block 415 and repeats until all data has been encrypted.

Figure 5:
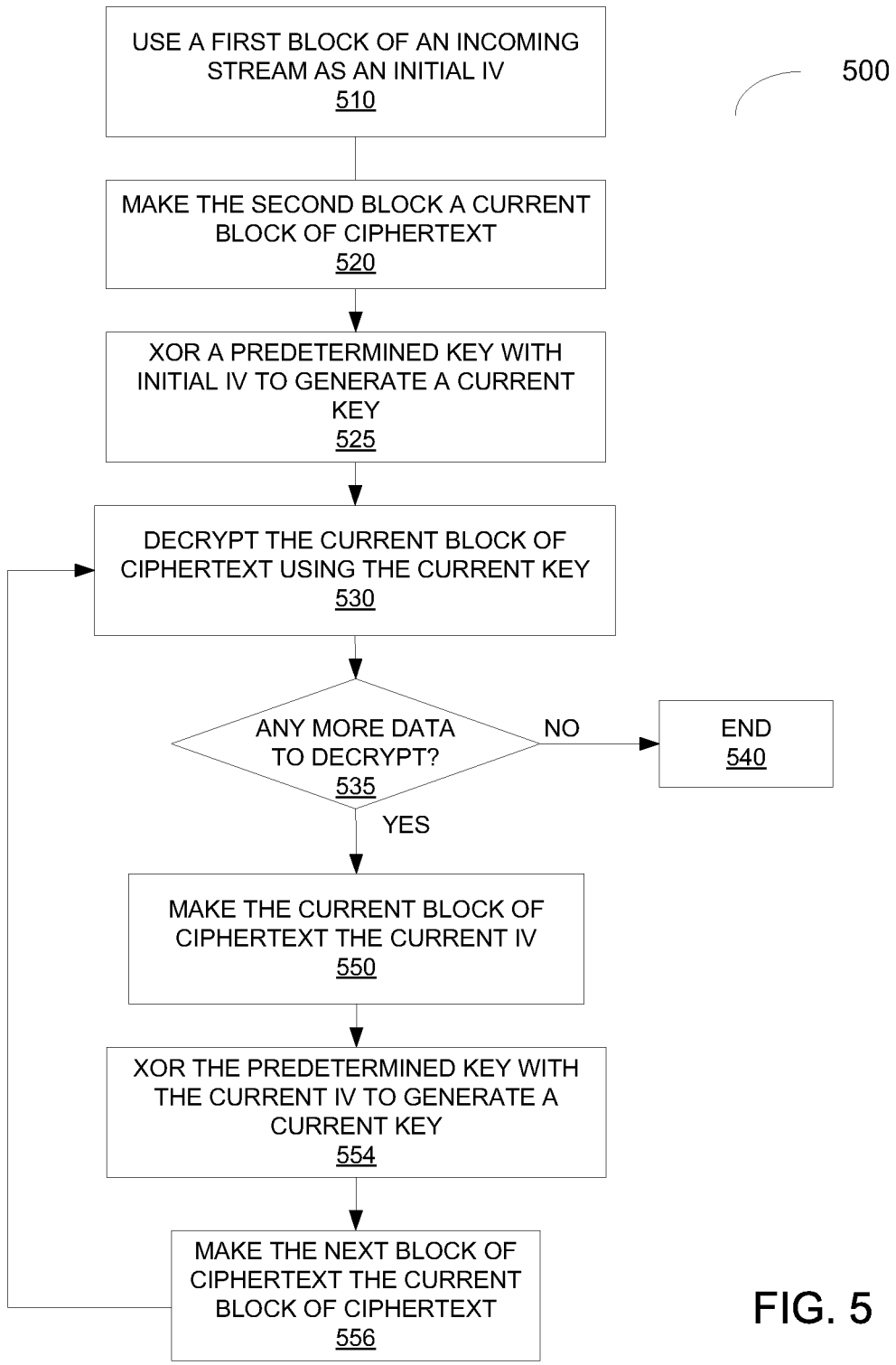
FIG. 5 illustrates a flow diagram of one embodiment for a method of decrypting data.

FIG. 5 illustrates a flow diagram of one embodiment for a method 500 of decrypting data. The method may be performed by processing logic that may comprise hardware (e.g., circuitry, dedicated logic, programmable logic, microcode, etc.), software (such as instructions run on a processing device), or a combination thereof. In one embodiment, method 500 is performed by encipherer 100 of FIG. 1.

Referring to FIG. 5, method 500 begins by using a first block at the beginning of an incoming ciphertext stream as an initial IV at block 510. Then the second ciphertext block in the stream is made a current ciphertext block at block 520. The initial IV is then XOR'ed with a predetermined key (also referred to as the original key) to generate a current key at block 525. Note that the predetermined key is the key that has been used to encrypt the data in the incoming ciphertext stream. At block 530, the current ciphertext block is decrypted using the current key. At block 535, it is checked if there is any more data to be decrypted. If not, the process ends at block 540. Otherwise, the process continues at block 550.

At block 550, the current ciphertext block is made the current IV. Then the predetermined key is XOR'ed with the current IV to generate another current key at block 554. At block 556, the next ciphertext block is made the current ciphertext block. Then the process returns to block 530 to repeat the above operations. The iteration continues until there is no more data to decrypt.

Figure 6:
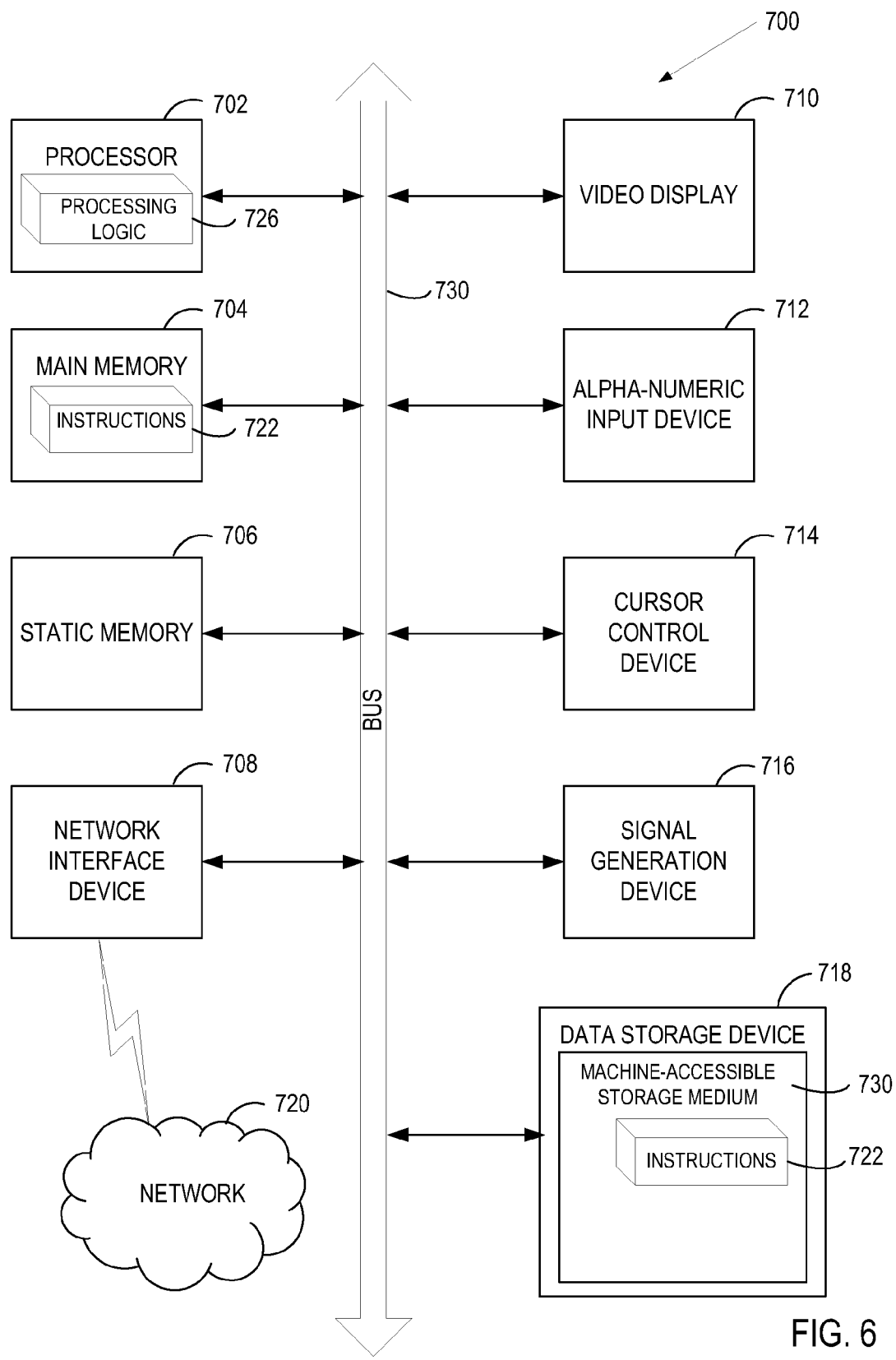
FIG. 6 illustrates a block diagram of an exemplary computer system, in accordance with one embodiment of the present invention.

FIG. 6 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

The machine-accessible storage medium 730 may also be used to store data structure sets that define user identifying states and user preferences that define user profiles. Data structure sets and user profiles may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A method comprising:
   generating, by a processing device, a first key from a combination of an original key and an initial initialization vector prepended to a stream of plaintext;
   selecting, by the processing device based on the generated key, a block cipher from a plurality of block ciphers of the computer;

enciphering, by the selected block cipher, a first plaintext block of a plurality of plaintext blocks of the stream using the first key to produce a first ciphertext block;

generating, by the processing device, a second key from a combination of the first ciphertext block and the original key; and enciphering, by the selected block cipher, a second plaintext block of the plurality of plaintext blocks using the second key to produce a second ciphertext block.

2. The method of claim 1, wherein the first ciphertext block has been enciphered using the original key.

3. The method of claim 1, wherein the original key comprises an initialization vector.

4. The method of claim 1, further comprising:
appending the first and second ciphertext blocks to an output stream.

5. The method of claim 1, wherein generating the current key comprises:
performing an exclusive-OR (XOR) operation on the first ciphertext block and the original key.

6. The method of claim 1, further comprising:
generating a block of random data to create the initial initialization vector; and
performing an exclusive-OR (XOR) operation on the initial initialization vector and the original key to generate the first key.

7. A method comprising:
generating a first key using a combination of an original key and an initial initialization vector comprising a first ciphertext block at a beginning of a stream of plaintext;
selecting, by a processing device based on the first key, a block cipher from a plurality of block ciphers;
deciphering, by the selected block cipher, a second ciphertext block in the stream using the first key to produce a first plaintext block;
generating, by the processing device, a second key from a combination of the second ciphertext block and the original key; and
deciphering, by the selected block cipher, a third ciphertext block in the stream using the second key to produce a second plaintext block.

8. The method of claim 7, wherein the first ciphertext block has been enciphered using the original key.

9. The method of claim 7, wherein the original key comprises an initialization vector.

10. The method of claim 7, wherein the generating the first key comprises:
performing an exclusive-OR (XOR) operation on the initial initialization vector and the original key.

11. The method of claim 7, wherein the generating the second key comprises performing an exclusive-OR (XOR) operation on the second ciphertext block and the original key.

12. An apparatus comprising:
a memory to store an initialization vector buffer to temporarily hold a first ciphertext block;
a processing device communicably coupled to the memory, the processing device to:
generate a first key from the first ciphertext block and an original key; and
select, based on the generated key, a block cipher from a plurality of block ciphers; and
the block cipher executable from the memory by the processing device, the block cipher to:
encipher a plaintext block of a plurality of plaintext blocks using the generated key to produce a second ciphertext block; and
store the second ciphertext block in the initialization vector buffer by replacing the first ciphertext block; and an initialization vector generator executable from the memory by the processing device, the initialization vector generator to generate an initial initialization vector, wherein one of the plurality of block ciphers performs an exclusive-OR XOR operation on the initial initialization vector and the original key to generate a second key and enciphers a first one of the plurality of plaintext blocks using the second key.

13. The apparatus of claim 12, wherein the first ciphertext block has been enciphered using the original key.

14. The apparatus of claim 12, wherein the original key comprises an initialization vector.

15. The apparatus of claim 12, further comprising an input/output device to append the second ciphertext block to an output stream.

16. The apparatus of claim 12, wherein the block cipher performs an exclusive-OR (XOR) operation on the first ciphertext block and the original key to generate the first key.

17. A system comprising the apparatus of claim 12, further comprising:
a network, wherein the first and second ciphertext blocks are sent via the network to a computing device.

18. An apparatus comprising:
a memory;
a processing device communicably coupled to the memory, the processing device to:
generate a first key using a combination of an original key and an initial initialization vector comprising a first ciphertext block at a beginning of a stream of plaintext;
select, based on the first key, a block cipher from a plurality of block ciphers;
decipher, by the selected block cipher, a second ciphertext block in the stream using the first key to generate a first plaintext block;
generate a second key from a combination of a second ciphertext block and the original key; and
decipher, by the selected block cipher, a third ciphertext block in the stream using the second key to generate a second plaintext block.

19. The apparatus of claim 18, wherein the first ciphertext block has been enciphered using the original key.

20. The apparatus of claim 18, wherein the original key comprises an initialization vector.

21. The apparatus of claim 18, wherein the combination of the second ciphertext block and the original key is generated by performing an exclusive-OR (XOR) operation on the second ciphertext block and the original key.

22. A system comprising the apparatus of claim 18, further comprising:
a network, wherein the first and second ciphertext blocks are received from a computing device via the network.

23. A non-transitory computer-readable medium that provides instructions that, when executed by a processing device, will cause the processing device to perform operations comprising:
generating, by the processing device, a first key from a combination of an original key and an initial initialization vector prepended to a stream of plaintext;
selecting, by the processing device based on the generated key, a block cipher from a plurality of block ciphers of the processing device;

enciphering, by the selected block cipher, a first plaintext block of a plurality of plaintext blocks of the stream using the first key to produce a first ciphertext block;

generating, by the processing device, a second key from a combination of the first ciphertext block and the original key; and enciphering, by the selected block cipher, a first plaintext block of the plurality of plaintext blocks using the second key to produce a second ciphertext block.

24. The non-transitory computer-readable medium of claim 23, wherein the first ciphertext block has been enciphered using the original key.

25. The non-transitory computer-readable medium of claim 23, wherein the original key comprises an initialization vector.

26. The non-transitory computer-readable medium of claim 23, wherein the operations further comprise:

appending the first and second ciphertext blocks to an output stream.

27. The non-transitory computer-readable medium of claim 23, wherein generating the second key comprises:

performing an exclusive-OR (XOR) operation on the first ciphertext block and the original key.

28. The non-transitory computer-readable medium of claim 23, wherein the operations further comprise:

generating a block of random data to create the initial initialization vector; and performing an exclusive-OR (XOR) operation on the initial initialization vector and the original key to generate the first key.

29. A non-transitory computer-readable medium that provides instructions that, when executed by a processing device, will cause the processing device to perform operations comprising:

generating a first key using a combination of an original key and an initial initialization vector comprising a first ciphertext block at a beginning of a stream of plaintext;

selecting, by the processing device based on the first key, a block cipher from a plurality of block ciphers;

deciphering, by the selected block cipher, a second ciphertext block in the stream using the first key to produce a first plaintext block;

generating, by the processing device, a second key from a combination of the second ciphertext block and the original key; and deciphering, by the selected block cipher, a third ciphertext block in the stream using the second key to produce a second plaintext block.

30. The non-transitory computer-readable medium of claim 29, wherein the first ciphertext block has been enciphered using the original key.

31. The non-transitory computer-readable medium of claim 29, wherein the original key comprises an initialization vector.

32. The non-transitory computer-readable medium of claim 29, wherein generating the first key comprises:

performing an exclusive-OR (XOR) operation on the initial initialization vector and the original key.

33. The non-transitory computer-readable medium of claim 29, wherein the generating the second key comprises performing an exclusive-OR (XOR) operation on the second ciphertext block and the original key.

* * * * *